June 11, 1968 J. J. HICKEY 3,388,284

SYNCHRONIZING ARRANGEMENT

Filed May 26, 1965 2 Sheets-Sheet 1

John J. Hickey,
INVENTOR.

BY. Jerry A. Dinardo

AGENT.

June 11, 1968 J. J. HICKEY 3,388,284

SYNCHRONIZING ARRANGEMENT

Filed May 26, 1965 2 Sheets-Sheet 2

John J. Hickey,
INVENTOR.

BY Jerry G. Dinardo

AGENT

United States Patent Office 3,388,284

Patented June 11, 1968

3,388,284
SYNCHRONIZING ARRANGEMENT

John J. Hickey, Hawthorne, Calif., assignor to TRW Inc., Redondo Beach, Calif., a corporation of Ohio Filed May 26, 1965, Ser. No. 458,860
7 Claims. (Cl. 315—18)

ABSTRACT OF THE DISCLOSURE

Rectangular gating pulses developed in a thyratron switching tube are used to unblank an image converter camera tube. A deflection waveform synchronized with the trailing edge of the gating pulse is developed in response to the trailing edge of the gating pulse.

Figure 1:
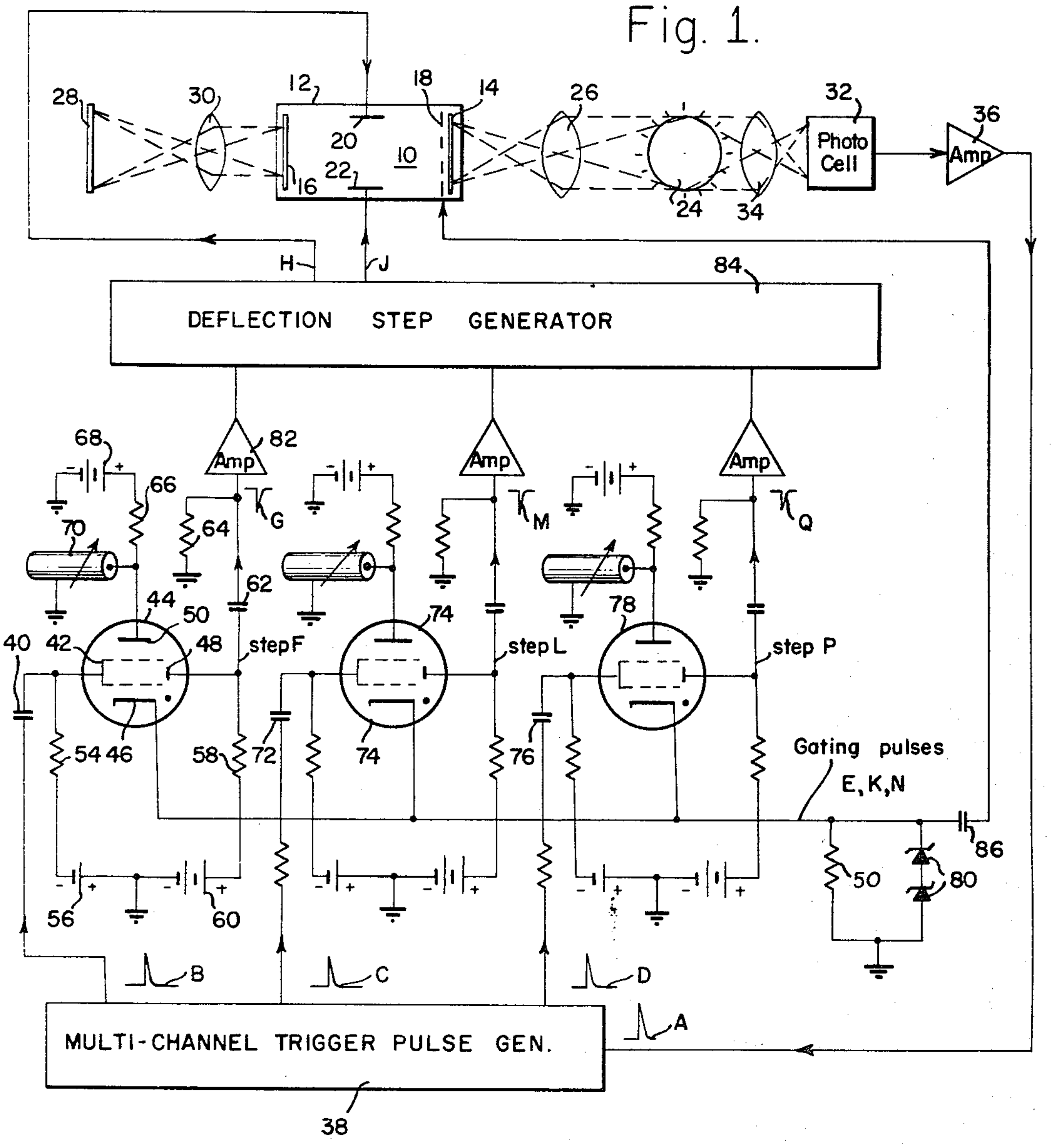

This invention relates generally to synchronizing circuits and particularly to arrangements for synchronizing gating and deflection waveforms in image converter cameras.

In high speed gating and deflection circuitry, such as is required in image converter cameras and other electronic display instruments, the problem of synchronizing the deflective waveform to the gating waveform becomes more severe as pulse times of the order of nanoseconds are approached. This is especially true when the deflection waveforms are step functions. There is a tendency for spurious oscillations to occur at the beginning of each step. Unless the voltage steps are stabilized prior to the application of a gating pulse, they will cause the output image to move and thereby smear the recording film.

Accordingly, an object of this invention is to improve the clarity of images in image converter cameras operating at nanosecond speeds.

A further object of this invention is to improve the synchronizing of gating and deflection waveforms in image converter cameras to the extent that the deflection voltages are stabilized prior to the occurrence of the gating pulses.

The foregoing and other objects are achieved in accordance with an embodiment of the invention by generating a train of gating pulses which are applied to the gating electrode of an image converter camera tube, and utilizing the trailing edges of the gating pulses to initiate the steps in a deflection voltage waveform. In this way the entire time interval between successive gating pulses is utilized to stabilize each deflection voltage step.

Considered from one aspect, this invention is an improvement over the high speed pulse control circuit disclosed in U.S. Patent No. 3,096,484. In that patent, the gating pulses are triggered by a pulse derived from the deflection circuit. That is, the gating pulse is initiated a fixed time after the occurrence of the deflection pulse. This fixed time relationship obtains irrespective of the interval between gating pulses, and is determined by the minimum interval for which the system is designed. Therefore, transient oscillations which are inherent in the deflection waveform do not have sufficient time to stabilize prior to the initiation of the gating pulse.

In accordance with this invention, the deflection waveform is initiated by the trailing edge of the preceding gating pulse. Therefore the timing of deflection waveform is responsive to changes in the gating pulse duration and the interval between gating pulses. Accordingly, a maximum amount of time is available for stabilizing the transient oscillations in the deflection waveform prior to the occurrence of the next gating pulse.

Figure 2:
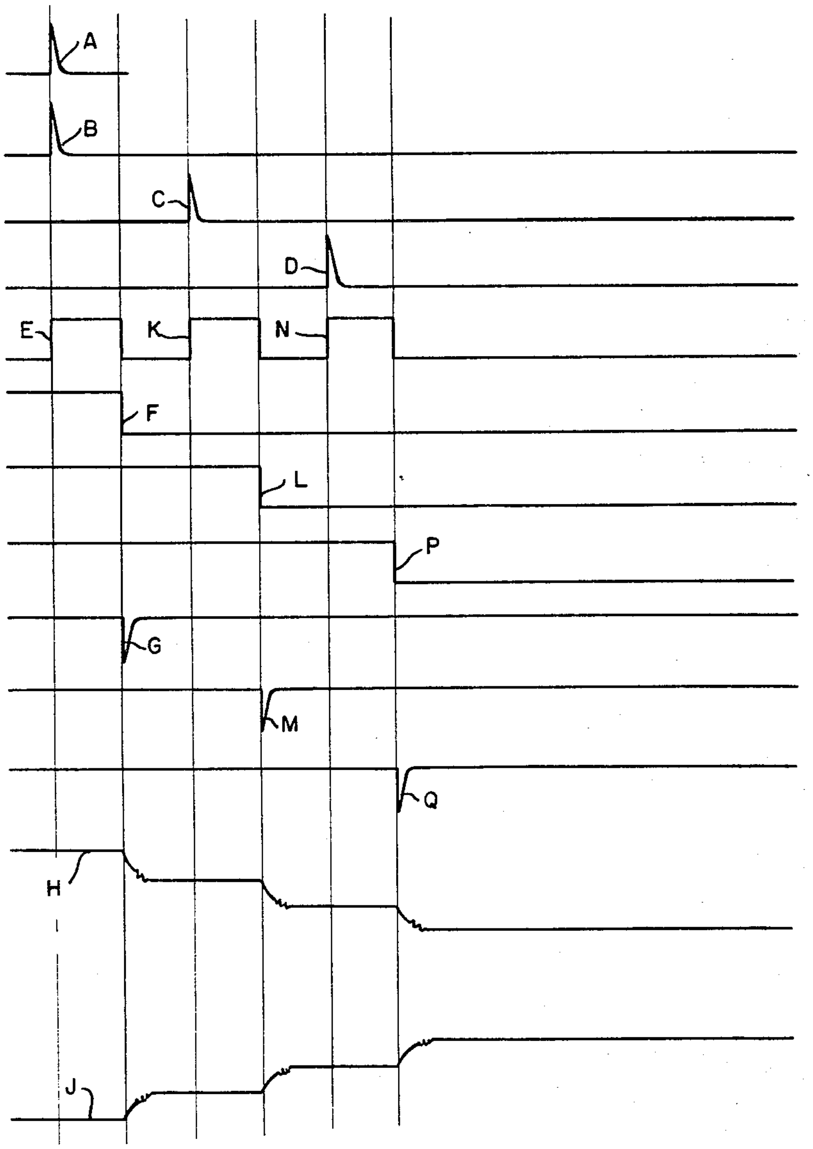

In the drawing:

FIG. 1 is a schematic diagram of an image converter camera system utilizing the synchronizing arrangement of the invention; and FIG. 2 is a diagram of waveforms useful in explaining the operation of the invention.

Referring now to the drawing in which like numerals refer to similar parts, FIG. 1 is a schematic diagram of an image converter camera in which the improved synchronizing arrangement of the invention finds particular utility. The image converter camera includes as one of its principal components an image converter tube 10 which functions primarily as a high speed shutter. Another function of the image converter tube 10 is that of providing light amplification for the extremely short frame times involved in its high speed photographic operation.

The image converter tube 10 comprises essentially a cylindrical evacuated envelope 12 containing a photoemissive cathode or photo cathode 14 at one end, a fluorescent screen 16 at the other end, a control grid 18 adjacent to the photo cathode 14, and a pair of deflection plates 20 and 22 intermediate the control grid 18 and fluorescent screen 16. Certain other parts and components essential to the operation of the tube 10 are omitted for simplicity, since these are well known. For example, the tube 10 ordinarily contains additional electrodes such as an anode and focusing electrodes and also requires a high voltage supply. It will suffice to say that the tube may be one of the kind manufactured by RCA and bearing the type number 4449A.

It will be apparent that with an object 24 such as gas, heated to a temperature of millions of degrees, for a period of a few nanoseconds, the problem of obtaining desired data is acute. In the operation of the electronic camera for the purpose of photographing high speed transient phenomena, light from an object 24 is focused by a lens 26 onto the photo cathode 14 of the image converter tube 10. The electron image emitted from the photo cathode 14 is normally prevented from reaching the fluorescent screen 16 by the application of a sufficiently high negative blanking voltage to the control grid 18 relative to the photo cathode 14.

According to one mode of operation of the camera, a rapid series of frames or exposures of the phenomena or object 24 can be taken by applying a series of rectangular gating voltage pulses to the control grid 18. The gating voltage pulses are sufficiently large, such as 300 volts, to unblank the control grid 18 and permit the electron image to be accelerated towards the fluoroescent screen 16. The different frames or exposures may be reproduced side-by-side on the fluorescent screen by applying deflection voltages to the deflection plates 20 and 22 respectively, between and during successive gating pulses. The amplified light images appearing on the fluorescent screen are then projected onto a photographic film 28 by means of a lens system 30. In practice the film 28 may be part of a camera of the type which allows rapid development of the exposed film 28.

A trigger signal for actuating the electronic camera tube 10 is developed in a circuit which includes a photocell 32 exposed through a lens system 34 to the phenomenon or object 24 to be recorded. The beginning of the event, for example, may be manifested by initial emission of light from the object 24. The light emission is picked up by the photocell 32 where it is converted into an electrical pulse. The electrical pulse is amplified in an electrical amplifier 36, and the amplified pulse A is fed to a multi-channel trigger pulse generator 38 which triggers circuits for generating the deflection and gating voltages.

The trigger pulse generator 38 produces a number of separate trigger pulses B, C, D that are displaced in time by as little as 50 nanoseconds. Each of the trigger pulses B, C, and D are fed to gating pulse generators. The first trigger pulse B is fed through a capacitor 40 to the control electrode 42 of a first thyratron switching tube 44, which is preferably a type 2D21 tetrode. The other elements of the tube 44 include a cathode 46, a primary anode 48 surrounded by the control electrode 42, and a secondary anode 50 spaced from the control electrode 42.

The switching tube 44 is connected and operated in a non-conventional manner, more fully disclosed in U.S. Patent 3,088,052 to George L. Clark and John J. Hickey. For example, the control electrode 42, or the electrode which is used herein to trigger the tube 44 into conduction usually functions as a shield electrode in conventional circuits, whereas the primary anode 48 is usually employed in conventional circuits to trigger the tube into conduction.

A cathode load resistor 52 is connected between the cathode 46 and ground. The control electrode 42 is biased to a highly negative potential by connection through a grid bias resistor 54 to a negative voltage source 56. The bias on the control electrode 42 is in excess of the cutoff bias of the tube 44.

The primary anode 48 is supplied with a moderately high positive potential by connection through a voltage dropping resistor 58 to a primary anode voltage source 60. The positive bias on the primary anode should be set to a level equal to the amplitude of the pulse to be generated across the load resistor 52. The primary anode 48 is also connected to a differentiating network including a capacitor 62 and resistor 64.

The secondary anode 50 is supplied with a relatively high positive potential by connection through a voltage dropping resistor 66 to a secondary anode voltage source 68. A variable pulse forming network 70 is connected between the secondary anode 50 and ground. The network 70 may be made variable by switching in different lengths of delay cable. The resistance of the cathode load resistor 52 is selected to be equal to or less than the characteristic impedance 20 of the pulse forming network 70.

The second trigger pulse C, which is delayed rleative to the first trigger pulse B, is fed through a capacitor 72 to the control electrode of a second thyratron switching tube 74 which is identical to the first switching tube 44. Similarly, the third trigger pulse D, which is delayed relative to the second trigger pulse C, is fed through a capacitor 76 to the control electrode of a third thyratron switching tube 78, which is identical to the first and second tubes 44 and 74. The circuits associated with the second and third tubes 74 and 78 are identical to that of the first switching tube 44, and they require no further description except for the fact that all of the cathodes of the tubes 44, 74, and 78 are connected to the common cathode load resistor 52.

The operation of the synchronizing arrangement will now be described with the aid of the waveforms of FIG. 2. Prior to the application of the first trigger pulse B, the first switching tube 44 is held nonconducting by the control grid bias received from the negative voltage source 56. The pulse forming network 70 is charged to the potential of the secondary anode voltage source 68.

The first trigger pulse B applied to the control electrode 42 renders the first switching tube conducting, thereby causing the pulse forming network 70 to discharge its voltage through the tubes 44 and cathode load resistor 52. A first rectangular gating pulse E is produced across the cathode load resistor 52. The duration of the pulse E is determined by the time required for the pulse forming network 70 to fully discharge, which in turn is determined by the circuit values selected for the network 70. The top of the pulse E is clipped by a voltage limiter, comprising a pair of Zener diodes 80 connected in series across the cathode load resistor 52.

Since the capacitance of capacitor 62 is extremely low, of the order of a few picofarads, it will not contribute significantly to the cathode current. The voltage on the primary anode 48 will not change while the tube 44 is conducting, despite the presence of a conducting path between the cathode 46 and primary anode 48. There is no voltage change because the primary anode 48 is initially supplied by the source 60 with a voltage equal to that which the rectangular pulse E would rise.

When the first gating pulse E falls, however, the voltage of the primary anode 48 falls with it, to produce a negative step voltage F coinciding in time with the trailing edge of the gating pulse E. The step voltage F is differentiated by the capacitor 62 and resistor 64 to produce a sharp negative pulse G across the resistor 64.

The negative pulse G is fed to an amplifier 82 where it is amplified and inverted and the amplified and inverted pulse is fed to one channel of a deflection step generator 84. The deflection step generator 84 may be one of the kind disclosed in copending application of John J. Hickey, Ser. No. 283,503, filed May 27, 1963, now Patent No. 3,214,633. The deflection step generator 84 produces two push-pull step voltage waveforms H and J, with the first two oppositely going steps being produced by and coinciding in time with the first differentiated and amplified pulse G, and with the succeeding steps being produced and coinciding in time with later generated pulses.

In a similar manner, the second trigger pulse C applied to the second switching tube 74 initiates the generating of a second rectangular gating pulse K, a second negative step voltage L, a second differentiated negative pulse M, and second coincident steps in the deflection waveforms H and J.

Likewise, the third trigger pulse D applied to the third switching tube 78 initiates the generation of a third rectangular gating pulse N, a third negative step voltage P, a third differentiated negative pulse Q, and third coincident steps in the deflection waveforms H and J.

The gating pulses E, K, and N are applied through a capacitor 86 to the control grid 18 of the image converter tube 10, and the deflection waveforms H and J are applied to the deflection plates 20 and 22, respectively.

It will be noted that the initial portions of the steps in the deflection waveforms H and J are distorted by spurious oscillations which arise through the stray capacitances and inductances of the circuit. If the gating pulses and deflection waveforms were synchronized such that the deflection step precedes the gating pulse by a short time interval, it is apparent that the oscillations in the deflection waveforms may occur during the gating-on period. If this were to occur, the image reproduced on the film 28 would smear. By synchronizing the deflection steps with the trailing edges of the gating pulses, the entire interval between successive gating pulses is utilized to allow the deflection steps to stabilize. The spurious oscillations will have disappeared by the time the next gating pulse is applied.

In accordance with an operative embodiment of the following circuit values were used:

| | | |
|---|---|---|
| Capacitor 40 | picofarads | 100 |
| Thyratron 44 | | 2D21 |
| Resistor 52 | ohms | 50–500 |
| Resistor 54 | kilohms | 10 |
| Voltage source 56 | volts | −100 |
| Resistor 58 | megohms | 10 |
| Voltage source 60 | volts variable | 300–400 |
| Capacitor 62 | picofarads | 5 |
| Resistor 64 | kilohm | 1 |
| Voltage source 66 | megohms | 2 |
| Voltage source 68 | volts | 1300 |
| Pulse forming network 70 | | 50–500 ohms Z. 5–1000 nanoseconds. |
| Capacitor 72 | picofarads | 100 |
| Thyratron 74 | | 2D21 |
| Capacitor 76 | picofarads | 100 |
| Thyratron 78 | | 2D21 |
| Diodes 80 | | 1N988B |
| Capacitor 86 | picofarads | 1000 |

The embodiments of the invention in which an exclusive property or privilege is claimed are defined as follows:

1. In combination with an image converter camera tube including electron beam gating means and electron beam deflection means:

means for producing a train of rectangular gating pulses;

means for applying said train of gating pulses to said electron beam gating means;

means selectively responsive to the trailing edges of said rectangular gating pulses for generating a deflection waveform having amplitude changes coincident in time with said trailing edges, with the amplitude level occurring between two successive amplitude changes being stabilized before the start of the next occurring gating pulse;

and means for applying said deflection waveform to said electron beam deflection means.

2. In combination with an image converter camera tube including electron beam gating means and electron beam deflection means:

means for producing a series of rectangular gating pulses;

means for applying said series of gating pulses to said electron beam gating means;

means responsive to the trailing edges of said rectangular gating pulses for generating a deflection waveform having voltage changes initiated respectively by said trailing edges;

and means for applying said deflection waveform to said electron beam deflection means.

3. In combination with an image converter camera tube including electron beam gating means and electron beam deflection means:

means for producing a train of rectangular gating pulses;

means for applying said train of gating pulses to said electron beam gating means;

means responsive selectively to the trailing edges of said gating pulses for generating push-pull step waveforms with the steps of each waveform synchronized respectively with said trailing edges;

and means for applying said step waveforms to said electron beam deflection means.

4. In combination with an image converter camera tube including electron beam gating means and electron beam deflection means:

a plurality of rectangular pulse generating circuits responsive selectively to a like plurality of trigger signals for producing a train of rectangular pulses;

means in each of said rectangular pulse generating circuits selectively responsive to the trailing edges of said rectangular pulses for deriving separate synchonizing pulses coinciding in time with said trailing edges respectively;

means responsive to said synchronizing pulses for generating a waveform having steps coinciding in time with said synchronizing pulses;

means for applying said train of rectangular pulses to said electron beam gating means;

and means for applying said step waveform to said electron beam deflection means.

5. In combination with an image converter camera tube including electron beam gating means and electron beam deflection means:

a plurality of rectangular pulse generating circuits each of which includes a thyratron switching tube having a cathode circuit, a primary anode circuit, and a secondary anode circuit, a pulse forming network in said anode circuit and dischargeable in series with said tube through said cathode circuit to derive a rectangular pulse in said cathode circuit, said secondary anode circuit including means responsive to the trailing edge of said rectangular pulse for deriving a synchronizing pulse coinciding in time with the termination of said rectangular pulse;

means responsive to said synchronizing pulse for generating a step waveform;

means for applying said rectangular pulse to said electron beam gating means;

and means for applying said step waveform to said electron beam deflection means.

6. In combination with an image converter camera tube including electron beam gating means and electron beam deflection means:

a plurality of rectangular pulse generating circuits responsive selectively to a like plurality of trigger signals for producing a train of rectangular pulses;

each of said rectangular pulse generating circuits including a thyratron trigger tube having a first electrode connected to a load circuit across which said rectangular pulses are developed, a second electrode coupled to said first electrode, and means for supplying said second electrode with an initial potential substantially equal to the amplitude of said rectangular pulses, whereby said second electrode undergoes a rapid potential change upon the termination of a corresponding rectangular pulse;

means coupled individually to said second electrodes for generating a step waveform synchronized with the potential changes of said second electrodes;

means for coupling said train of rectangular pulses to said electron beam gating means;

and means for coupling said step waveform to said electron beam deflection means.

7. In combination:

a thyratron including a cathode, a control grid, a primary anode, and a secondary anode;

a load impedance in the cathode circuit of said thyratron;

a pulse forming network in the secondary anode circuit of said thyratron;

means for biasing said control grid to render said thyratron initially nonconducting;

means for applying a trigger pulse to said control grid to cause said thyratron to conduct, thereby causing said pulse forming network to discharge current through said load impedance and develop a rectangular voltage pulse thereacross;

means for supplying said primary anode with an initial potential substantially equal to the amplitude of said rectangular voltage pulse;

a differentiating network in the primary anode circuit of said thyratron for differentiating the step voltage produced on said primary anode when said rectangular voltage pulse terminates;

a step generator;

and means for applying said differentiated voltage to said step generator to initiate a step voltage coinciding in time with the trailing edge of said rectangular voltage pulse.

References Cited

UNITED STATES PATENTS

| | | | |
|---|---|---|---|
| 2,991,459 | 7/1961 | Darois | 340—324.1 |
| 3,296,609 | 1/1967 | Wilhelmsen | 340—324.1 |
| 3,336,497 | 8/1967 | Osborne | 340—324.1 |
| 3,336,498 | 8/1967 | Castanera | 340—324.1 |

RODNEY D. BENNETT, *Primary Examiner.*

B. L. RIBANDO, *Assistant Examiner.*